Jan. 2, 1940.     C. E. GRAY ET AL     2,185,191
METHOD OF AND APPARATUS FOR FILLING CONTAINERS
Filed Aug. 28, 1937     3 Sheets-Sheet 1
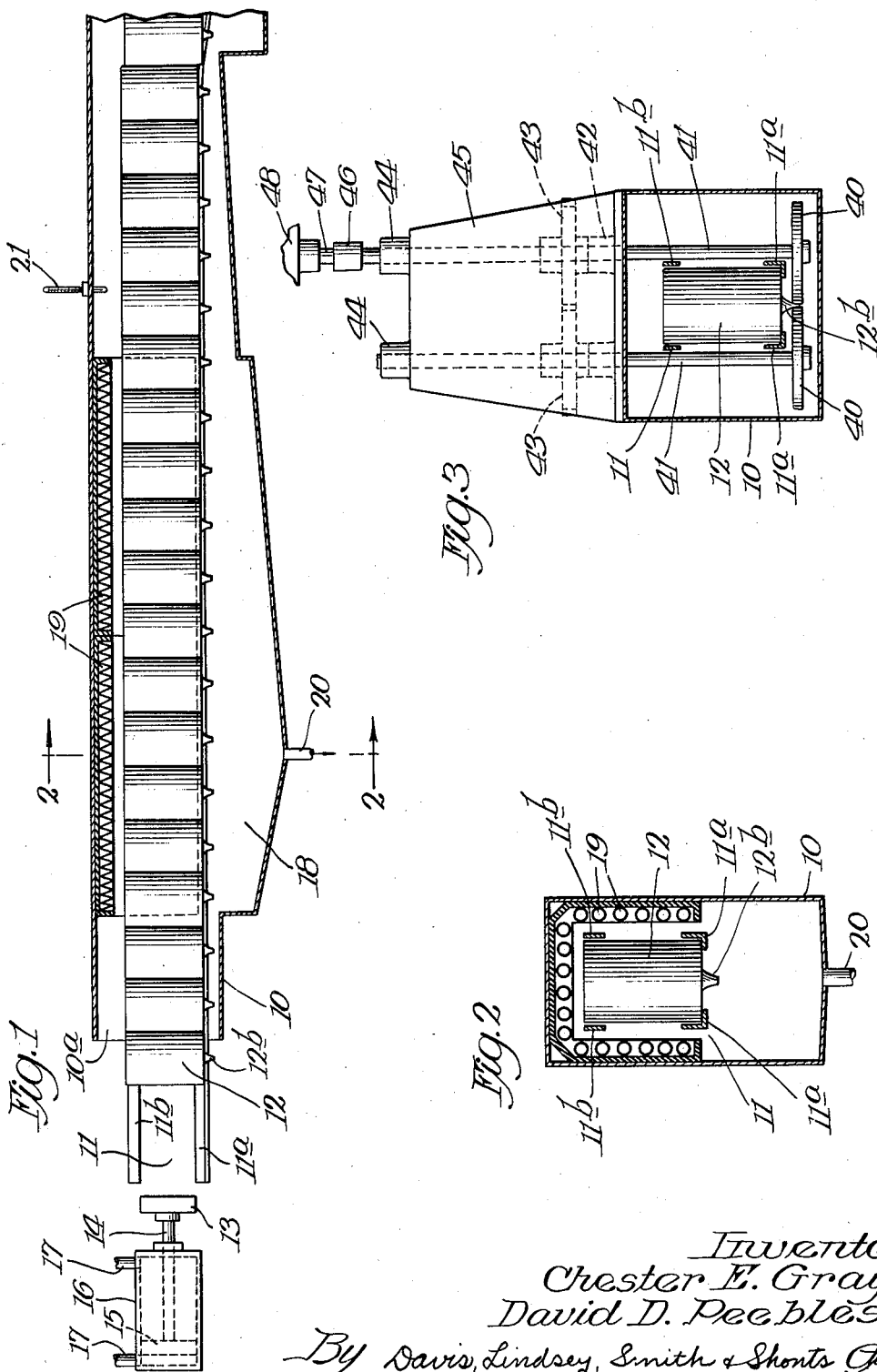
Inventors
Chester E. Gray
David D. Peebles
By Davis, Lindsey, Smith & Shonts Attys.

Jan. 2, 1940.　　　C. E. GRAY ET AL　　　2,185,191
METHOD OF AND APPARATUS FOR FILLING CONTAINERS
Filed Aug. 28, 1937　　　3 Sheets-Sheet 2

Inventors
Chester E. Gray
David D. Peebles
By Davis, Lindsey, Smith & Shonts Attys.

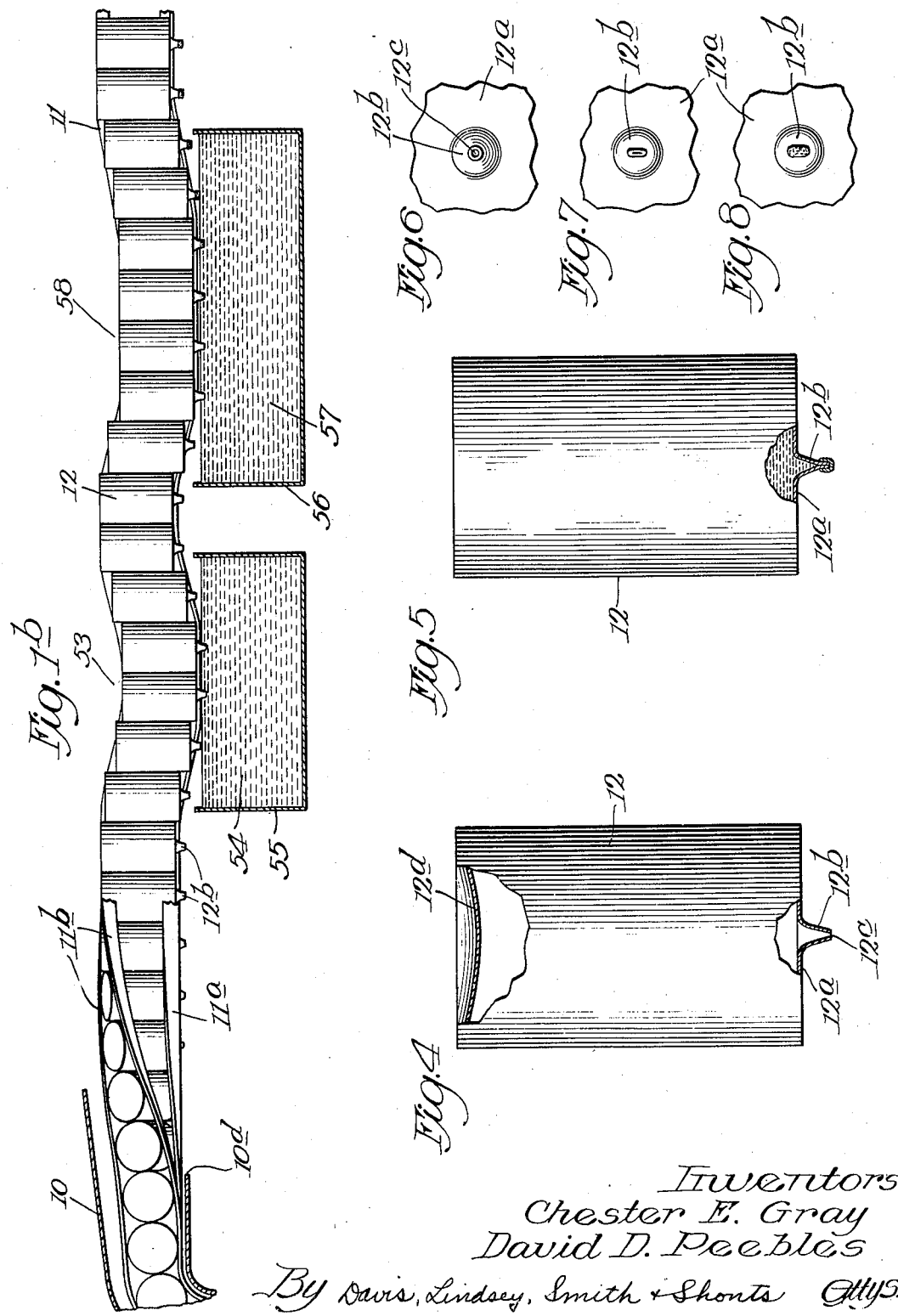

Patented Jan. 2, 1940

2,185,191

UNITED STATES PATENT OFFICE 2,185,191

METHOD OF AND APPARATUS FOR FILLING CONTAINERS

Chester E. Gray, Oakland, and David D. Peebles, Berkeley, Calif.

Application August 28, 1937, Serial No. 161,372

24 Claims. (Cl. 226—75)

This invention relates to a method of and apparatus for filling containers, such as metal cans, jars, bottles and the like, with fluids. Although capable of use for filling containers with various fluids, the invention may be employed with particular advantage for the purpose of filling sterilized containers with sterilized fluid products, since the entire operation may be carried on without the introduction of bacteria or other organisms of any kind into the products.

The improved method and apparatus are especially adapted for the packaging of milk, either normal milk or milk in the concentrated state, and particularly when the milk has been sterilized in advance of the packaging operation. Heretofore, it has been the universal practice to sterilize milk after concentration in sealed containers because of the practical impossibility of first sterilizing the milk and then packaging it in hermetically sealed containers without recontaminating the milk with organisms causing the milk to spoil. There are many disadvantages associated with the practice of sterilizing milk in sealed containers among which may be mentioned the fact that a large amount of time is required to heat the sealed containers and their contents to sterilizing temperatures and subsequently to cool them, but, so far as is known, none of the attempts, prior to the present invention, to sterilize milk or other food products in advance of the packaging operation has been commercially successful. These difficulties have been overcome by the present invention, with the use of which sterile milk and other sterile products may be filled into sterile containers and sealed therein with the certainty that the contents of the containers will be sterile and will remain in that condition.

The invention, in its broader aspects, comprises the operations of removing substantially all of the air from the container, then connecting the mouth of the container with the supply of the fluid product to be filled into the container, and then creating a differential of pressure between the inside and the outside of the container whereby the pressure on the outside is greater than that on the inside so that the product is thereby forced into the container. All of these operations are carried on in a sterile atmosphere. According to the preferred practice, the air in the container is displaced by a condensable vapor, such as steam, and this may preferably be accomplished by filling the container entirely full with water which has previously been boiled to remove the incorporated air, the water being preferably near the boiling point at the time of filling, whereupon the filled container is introduced into an atmosphere of steam and heat is applied to bring the water in the container to the boiling point, thus causing the water to be ejected by the resulting steam which forms in and fills the container. Having thus filled the container with steam, it is moved along in the steam atmosphere to a region of higher temperature, for example, about 325° Fahrenheit and it is maintained in this high temperature region until the steam inside of the container is superheated to that temperature and until the container is sterilized. The mouth of the container is then immersed in the product to be filled therein and the differential in pressure between the outside and the inside of the container is created, preferably, by cooling a small area of the container from the outside, thereby causing a partial condensation and a reduction in volume of the steam in the container which starts the flow of the product into the container under the influence of the greater pressure on the outside of the container. The supply of the product being maintained at a temperature which will cause the condensation of the steam in the container, the product flowing into the container causes a further condensation of the steam which maintains the flow until the container is almost entirely filled with the product. The quantity of the product thus filled into the container may be regulated within the required limits by varying the temperature of the product. The filling operation is preferably carried out in an atmosphere of low pressure superheated steam, the pressure being only slightly above that of the air surrounding the apparatus, so that there will be an outward flow of steam from the region of the apparatus and a consequent exclusion of any contaminating organisms. Having filled the container with the product, the mouth of the container is closed before it is moved to an atmosphere which may contain germs or bacteria. These and other features and objects of the invention will appear more fully hereinafter.

The nature of the invention will be understood from the following specification taken with the accompanying drawings in which one embodiment of apparatus embodying the present invention, and adapted for use in practicing the method of the invention, is illustrated. In the drawings:

Figures 1, 1a and 1b show a somewhat diagrammatic longitudinal vertical section through one form of apparatus embodying the invention, with parts thereof shown in side elevation;

Fig. 2 shows a vertical section taken on the line 2—2 of Fig. 1;

Fig. 3 shows an enlarged vertical section taken on the line 3—3 of Fig. 1a.

Fig. 4 shows a side elevation of one of the containers adapted to be filled by the apparatus illustrated in Figs. 1, 1a and 1b, with parts thereof illustrated in vertical section, the mouth or spout of the container being shown in its normal open condition ready to receive the product to be filled into the container;

Fig. 5 shows a side elevation of the container illustrated in Fig. 4, with parts thereof broken away, the spout being shown closed, corresponding to the condition which exists after the container has been filled;

Fig. 6 shows a bottom plan view of the central portion of the container illustrated in Fig. 4 with the spout in its open condition;

Fig. 7 is a view similar to that of Fig. 6 showing the condition of the spout after it has been temporarily closed by pressing the walls thereof together; and Fig. 8 is a view similar to that of Fig. 6 showing the condition of the spout after it has been permanently closed by applying thereto a layer of solder.

Figure 1A:
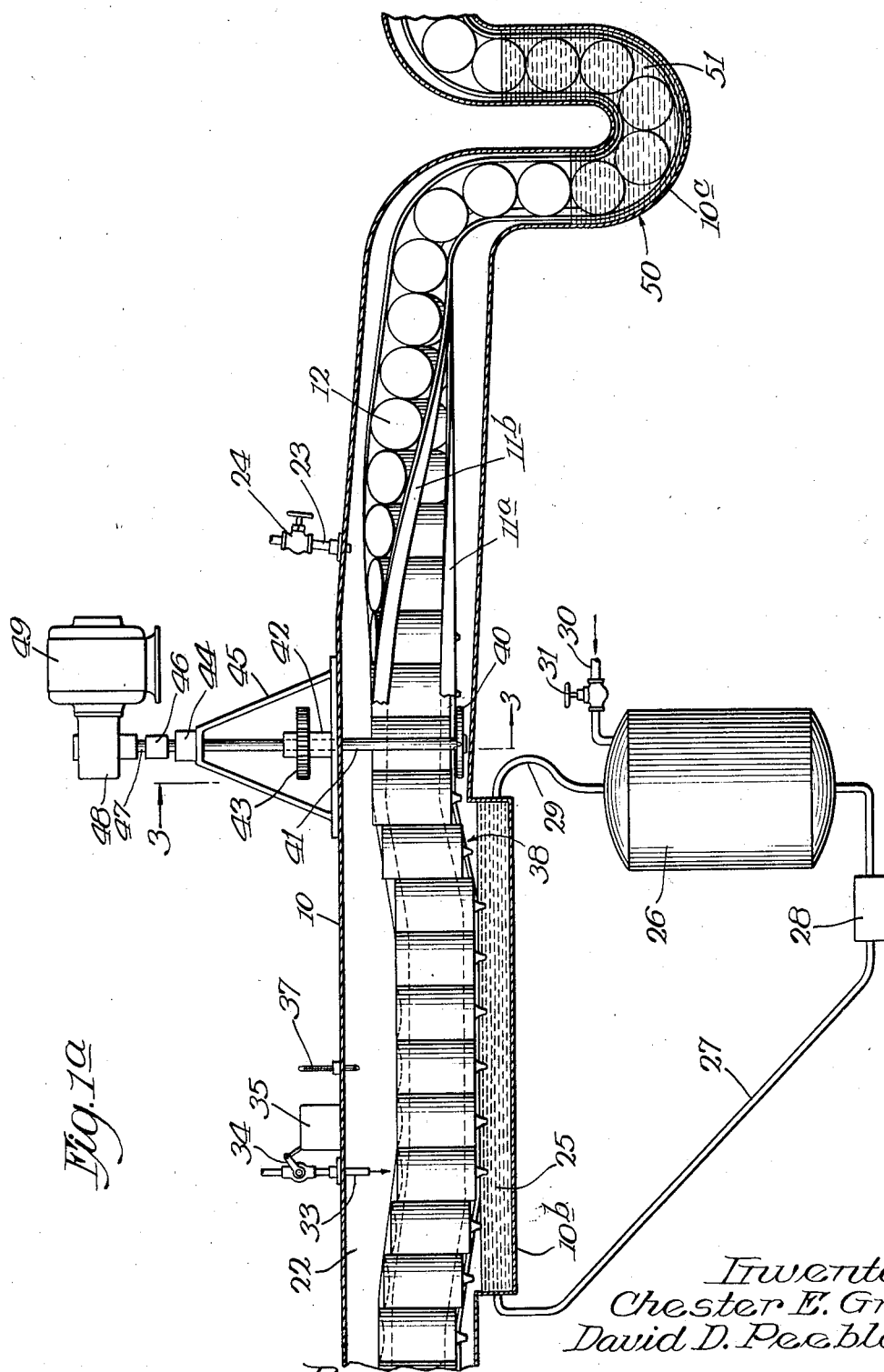

As illustrated in the drawings, the improved apparatus of the present invention comprises an elongated housing 10, of general rectangular cross section, which is formed of sheet metal or the like and which is adapted to exclude the surrounding air from its interior chamber, except for the inlet opening 10a from which a gradual flow of steam or the like is normally maintained in order to prevent contamination of the contents of the housing by bacteria, germs and other organisms. Extending throughout the housing 10, and beyond the discharge end thereof, is a conveyor 11 comprising a pair of spaced tracks 11a of angle bar form and parallel guides 11b in the form of flat bars, all of which are suitably supported within the housing so that they support and guide the metal containers 12, formed of sheet metal or the like, into which the product to be packaged is filled. These containers are cylindrical in form and rest at their lower ends on the lower flanges of the tracks 11a with the cylindrical walls of the containers lying at opposite sides in proximity to the vertical flanges of the tracks 11a and the bars 11b, located adjacent the upper ends of the containers, as shown particularly in Fig. 2. The end walls 12a of the containers are provided with cone-shaped spouts 12b having small mouths or orifices 12c through which the interior chamber of each can is filled. The opposite end wall 12d of the can is preferably concaved downwardly, when the can is in the position shown in Fig. 4, for a purpose hereinafter mentioned. The joints of the can are preferably formed by pressing the metal together according to the usual practice. When the cans are in position on the conveyor 11 they form a continuous series of cans extending throughout and beyond the housing 10 with adjacent cans contacting with each other on their cylindrical walls and with the spouts 12b extending downwardly between the tracks 11a. For the purpose of propelling the cans or containers 12 through the housing 10 along the conveyor 11, suitable actuating mechanism may be provided, such as a plunger 13 carried by a piston rod 14 which is actuated by a piston 15 located in a cylinder 16 to which compressed fluid may be supplied and exhausted through pipes 17. Any other suitable means for intermittently pushing the end can of the series, to give the cans an intermittent or step-by-step motion, may be employed.

In the practice of the process, the cans or containers 12 are first filled with water which has previously been boiled to drive out substantially all of the air contained therein and, after a can has thus been filled, it is placed in inverted position, with the spout extending downwardly, on the conveyor 11 just outside of the mouth 10a of the housing where it may be engaged by the plunger 13 upon its next forward motion. If the orifice 12c forming the mouth of the can is sufficiently small, the viscosity of the water will be sufficient to prevent the water from flowing out when the can is thus inverted, and as the filled can proceeds by a step-by-step motion into the housing, it reaches a region 18 where a high temperature, for example from 250° Fahrenheit to 275° Fahrenheit, is created and maintained by means of electric heating elements 19 connected in a suitable electric circuit and extending, preferably, across the top wall of the housing and down the sides thereof, as shown in Figs. 1 and 2. This high temperature will cause the water in the containers 12 to boil with the result that steam will be created within the containers which will cause the remaining water therein to be discharged downwardly into the lower part of the space 18 from which it drains off through a pipe 20. The temperature in the portion 18 of the housing may be indicated by a thermometer 21 mounted in the top wall thereof. After the water has been discharged from the containers 12 and while they are still filled with steam, they move along the conveyor 11 to another region 22 within the housing where a still higher temperature, about 325° Fahrenheit, is maintained due to the introduction into the housing, beyond this point, of superheated steam which is under a light pressure, for example, about five pounds per square inch, and which enters through a pipe 23 controlled by a valve 24. As the cans enter the region 22 within the housing 10, the members 11a and 11b of the conveyor are inclined downwardly so that the depending spouts 12b of the containers are caused to project into a body 25 of milk or other fluid product which is to be filled into the containers and which is contained in an open tank formed by the depressed portion 10b of the housing. The milk or other fluid is maintained at a predetermined level in this tank and is preferably maintained in continuous movement, being supplied thereto from a storage tank 26 by a pipe 27 through which the milk or other fluid is propelled by a pump 28. The overflow or discharge from the tank 10b returns to the storage tank 26 through a pipe 29. A suitable quantity of the fluid product to be filled into the containers is supplied to the storage tank 26 through a pipe 30 controlled by a valve 31. The speed of the pump 28 and the proportions of the other parts are preferably arranged so that the surface speed of the fluid product 25 in the tank 10b is substantially the same as the speed of travel of the spouts 12b when the containers 12 are in motion.

As each can 12 reaches a position where its spout 12b has entered the body of fluid 25 in the tank 10b a few drops of cold sterile water, or the like, are dropped onto what is then the uppermost end of the can, being the concave wall 12d thereof, through a pipe 33. The flow of water through this pipe may be controlled by a valve 34 which is actuated by a suitable timing mechanism 35 in order to cause the valve to open periodically each time a new can arrives in position beneath the pipe 33. As a result of the high temperature which is maintained in the region 22 of the housing, which temperature may be indicated by a thermometer 37 mounted in the top wall of the housing, the steam on the inside of each container 12 is superheated to the temperature of the chamber and the container is completely sterilized. The container having its spout immersed in the body of fluid 25 has a differential of pressure created between the inside and the outside thereof due to the action of the cold water supplied to the upper end of the can from the pipe 33. This causes a partial condensation of the superheated steam within the can and a corresponding contraction of its volume with the result that the higher pressure on the outside of the can, within the housing 10, causes a portion of the milk or other fluid 25 to flow upwardly into the can. This milk or other fluid is preferably maintained at a temperature of about 100° Fahrenheit or at a suitable temperature below that of the vapor within the can so that as the milk or other fluid product 25 flows into the can it causes a further condensation of the superheated steam therein and this condensation continues until the can is substantially filled with the fluid 25. It will be apparent that by varying the temperature of the body of fluid 25 in the tank 10$^b$, substantially any desired degree of filling of the can may be brought about due to the differential of pressure which is created. It has been found, for example, that a degree of vacuum may be set up in the container which will cause it to be 98 per cent full after the spout of the can has passed through the body of fluid in the tank 10$^b$.

After being thus filled, each can, as it nears the discharge end of the tank 10$^b$, is elevated by the upward inclination of the conveyor 11, as shown at 38, thus taking the spouts in succession out of engagement with the body of fluid 25. The spout is then promptly closed by mechanical means located within the housing 10 so that the fluid contents of the container will be prevented from flowing out during the subsequent movement of the container from the housing. This temporary or preliminary closure may be effected by a pair of rollers 40, shown in Figs. 1$^a$ and 3, mounted on the lower ends of shafts 41 which extend downwardly through the upper wall of the housing on the opposite sides of the conveyor 11. Fluid tight bearings 42 are provided at the points where these shafts pass through the wall of the housing and the two shafts are geared together at this point, outside of the housing, by a pair of gears 43 which intermesh with each other. The upper ends of the shafts are journaled in bearings 44 carried by a bracket 45 which is mounted on top of the housing and one of these shafts is connected by a coupling 46 with the shaft 47 of a worm gear speed reducer 48. This speed reducer is actuated by an electric motor 49 so that when the two shafts 41 are actuated they cause the rollers 40 to rotate in opposite directions with those portions of their peripheries which are in proximity to the spouts 12$^b$ of the cans moving toward the discharge end of the housing. As the cans move toward the discharge end of the housing, the lower ends of their spouts 12$^b$ pass between the rollers 40 with the result that the opposite walls of the spout are pressed together, as shown in Fig. 7, to form a substantially tight joint.

As the cans continue their rearward movement beyond the rollers 40, they are turned through 90° from the positions they occupy when entering the housing in order to pass them through a fluid seal designated generally by the numeral 50, which seal is provided for the purpose of preventing the entrance of air into the housing 10 at the discharge end thereof. By sealing the chamber at this point and by introducing superheated steam through the pipe 23 at a pressure somewhat above that of the surrounding air, a constant flow of steam is maintained through the housing toward and through the inlet opening 10$^a$ so that a sterile condition is maintained throughout the housing 10 at all times. The seal 50 comprises an elbow-shaped continuation 10$^c$ of the housing 10 which is looped downwardly and which is partially filled with a body of water 51. In order to pass the cans through this U-shaped portion of the housing, the bars 11$^a$ and 11$^b$ of the conveyor 11 are twisted so that the containers 12 are gradually turned through 90° as they approach the seal 50.

The closed containers are thus passed succession through the sealing fluid 51 and they then emerge from the discharge end 10$^d$ of the housing, as shown in Fig. 1$^b$, where they are then returned to their original positions, with their spouts extending downwardly, by again twisting the bars 11$^a$ and 11$^b$ of the conveyor to effect the reverse turning of the containers. In order to provide a permanent seal for each can, the conveyor is again bent downwardly at 53 to cause the lower ends of the spouts 12$^b$ of the containers to enter an acid bath 54 contained in a tank 55. After the spouts pass through this bath the conveyor 11 again elevates the containers so that they pass over the wall of the tank 55 and over the wall of another tank 56 which contains a bath of solder 57. The conveyor tracks are again dipped or bent downwardly at 58 to cause the lower ends of the spouts 12$^b$ of the containers to enter the bath of solder where the spouts, which have previously been cleaned by the acid 54, acquire a layer of solder which provides an hermetic seal for each container. The filled and sealed containers may then be removed from the discharge end of the conveyor 11 and packed for storage or shipment. In this way a sterile product may be filled into containers after sterilization and the containers may then be sealed in a sterile atmosphere without danger of recontamination by organisms adapted to spoil the contents of the cans.

When the containers 12 are provided with spouts 12$^b$ which are of such size that the contents of the cans will remain in them when they are arranged with their spouts extending downwardly, the containers may be filled by discharging hot water into them through nozzles having discharge openings of smaller size than the openings of the spouts. If the containers 12 have mouths of such size that the contents thereof will not remain in the containers when they are inverted, the containers may be placed on the conveyor 11 in upright positions and may be maintained in those positions until the water has been discharged therefrom by the production of steam within the containers, whereupon the containers filled with steam may be turned through 180° in order to permit their mouths or inlet openings to enter the bath of fluid which is to be filled into the containers.

Although one form of the improved apparatus has been shown and described in connection with the explanation of one example of the improved method of the present invention, it will be understood that the apparatus may be embodied in various forms and that the method may be carried out in various ways coming within the scope of the appended claims.

We claim:

1. The method of filling a container with a fluid, which comprises the operations of removing the air content of the container, connecting the container while in motion from an entrance to an exit position in a sterile atmosphere with a stationary supply of the fluid to be filled therein, and then creating a difference in pressure between the inside and the outside of the container while maintaining said connection and continuing said motion whereby the pressure on the outside of the container acting on said fluid forces said fluid into said moving container.

2. The method of filling a container with a fluid, which comprises the operations of replacing the air content of the container by a condensable vapor, connecting the container while in motion from an entrance position toward an exit position with a stationary supply of fluid to be filled therein, and then causing the condensation of said vapor while continuing said motion and maintaining said connection whereby the greater pressure on the outside of said container acting on said fluid forces said fluid into said container.

3. The method of filling a container with a sterile fluid product, which comprises the operations of removing the air content of the container, subjecting the container to a sterilizing temperature while in motion from an entrance position to an exit position in a sterile atmosphere, connecting the container while continuing said motion thereof with a stationary sterile fluid supply subjected to the pressure of said atmosphere, and then creating a difference of pressure between the inside and outside of the container while continuing said motion and maintaining said connection to cause the fluid to flow into said container.

4. The method of filling containers with a fluid in a continuous process, which comprises the operations of moving the containers in succession through a chamber, maintaining a sterile atmosphere in said chamber, connecting the containers in succession while in motion in said chamber with a supply of the fluid to be filled therein, and creating a difference in pressure between the inside of each container and the outside of that container while it is in connection with said fluid supply, whereby the containers are successively filled by the pressure of said atmosphere acting on said fluid supply.

5. The method of filling containers with a fluid in a continuous process, which comprises the operations of replacing the air content of the containers by a condensable vapor, moving the containers in continuous series through a chamber in which a sterile atmosphere is maintained, connecting the containers in succession while in motion in said chamber with a supply of the fluid to be filled in said chamber, and then causing the condensation of said vapor in each container while it is connected with said fluid supply, whereby the pressure of said atmosphere in said chamber acting on said fluid supply forces said fluid into said containers.

6. The method of filling containers with a fluid in a continuous process, which comprises replacing the air content of small-mouthed containers with a liquid, moving said containers in succession in inverted positions in a chamber, maintaining a sterile atmosphere in said chamber, heating said containers in said chamber to vaporize a portion of said liquid from said containers and to expel the remainder of the liquid leaving the containers filled with the resulting vapor, then moving said containers in succession in said chamber to connect the mouths of said containers while in motion with a fluid supply containers while in motion with a fluid supply subjected to the pressure of said atmosphere, and then condensing the vapor in said containers while said containers are connected with said fluid supply, whereby the pressure of said atmosphere in said chamber forces said fluid into said containers.

7. The method of filling a container with a fluid, which comprises the operations of replacing the air content of said container by a liquid, vaporizing a portion of said liquid to expel the remainder of the liquid and leave the container filled by the resulting vapor, connecting the container with a supply of fluid to be filled into the container, and then effecting the condensation of said vapor to reduce the pressure in said container as compared with the pressure acting on said fluid supply.

8. The method of filling a container with a fluid, which comprises the operations of replacing the air content of the container by a liquid, vaporizing a portion of said liquid to expel the remainder of the liquid and leave the container filled with the resulting vapor, subjecting the container and its contents to the action of a sterilizing temperature in a sterilizing atmosphere, connecting the container to a supply of sterile fluid subjected to the pressure of said atmosphere, and then effecting the condensation of said vapor in said container to cause said fluid to flow into said container under the influence of the pressure of said atmosphere.

9. The method of filling a container with a fluid, which comprises the operations of replacing the air content of the container by a liquid from which the air has been removed, vaporizing a portion of said liquid to expel from the container the remainder of said liquid and leave the container filled with the resulting vapor, connecting the container with a supply of the fluid to be filled into the container, and then effecting the condensation of said vapor in said container to create a degree of vacuum therein sufficient to cause said fluid to flow into said container.

10. The method of filling a container with a fluid, which comprises the operations of replacing the air content of the container by a liquid from which the air has been removed, vaporizing a portion of said liquid to expel from the container the remainder of said liquid and leave the container filled with the resulting vapor, subjecting the container and its contents to the action of a sterilizing temperature in a sterilizing atmosphere, connecting the container to a supply of sterile fluid subjected to the pressure of said atmosphere, and then effecting the condensation of the vapor in said container to cause said fluid to flow into said container.

11. The method of filling a container with a fluid, which comprises the operations of replacing the air content of the container by a condensable vapor, heating the container and its contents by the external application of heat to the container, connecting the container with a supply of the fluid to be filled therein, and then cooling a portion of the heated container to cause the condensation of said vapor whereby the greater pressure on the outside of said container acting on said fluid forces said fluid into said container.

12. The method of filling a container with a fluid, which comprises the operations of replacing the air content of the container by a condensable vapor, heating the container and its contents to a sterilizing temperature in a sterile atmosphere, connecting the container with a supply of fluid which is subjected to the pressure of said atmosphere and which has a temperature lower than that of the vapor in said container, and then cooling a portion of said container to cause the partial condensation of the vapor therein whereby the pressure of said atmosphere acting on said fluid starts the flow of said fluid into said container, said fluid acting to effect the further condensation of said vapor in said container whereby the flow of said fluid continues until said container is substantially filled.

13. The method of filling a container with a fluid, which comprises the operations of replacing the air content of the container by a condensable vapor, heating the container and its contents to a sterilizing temperature in a sterile atmosphere, connecting the container with a supply of fluid which is subjected to the pressure of said atmosphere and which has a temperature lower than that of the vapor in said container, and then cooling a portion of said container to cause the partial condensation of the vapor therein whereby the pressure of said atmosphere acting on said fluid starts the flow of said fluid into said container, said fluid acting to effect the further condensation of said vapor in said container whereby the flow of said fluid continues until said container is substantially filled, and varying the extent of filling of said container by regulating the temperature of said fluid supply.

14. The method of filling a container with a fluid, which comprises the operations of replacing the air content of the container by condensable vapor, heating the container and its contents to a sterilizing temperature in a sterile atmosphere, connecting the container with a supply of sterile fluid subjected to the pressure of said atmosphere, and then applying cold sterile water to a portion of said container to effect the condensation of the vapor in said container to a point where the pressure in said container is less than the pressure of said atmosphere acting on said fluid.

15. The method of filling a container with a fluid, which comprises the operations of filling the container with a liquid, moving the container through a closed chamber, maintaining in said chamber an atmosphere of superheated steam having a pressure greater than that of the air surrounding said chamber, heating said container and its contents in said chamber to vaporize a portion of said liquid and thereby cause the remainder of the liquid to be expelled from said container by the vapor pressure therein, connecting said vapor filled container with a supply of sterile fluid in said chamber, and applying a cooling medium to the external surface of said container to effect the condensation of the vapor therein whereby the pressure in said chamber acting on said fluid causes said fluid to flow into said container.

16. The method of filling a container with a fluid, which comprises the operations of filling the container with a liquid, moving the container through a closed chamber, maintaining in said chamber an atmosphere of superheated steam having a pressure greater than that of the air surrounding said chamber, heating said container and its contents in said chamber to vaporize a portion of said liquid and thereby cause the remainder of the liquid to be expelled from said container by the vapor pressure therein, connecting said vapor filled container with a supply of sterile fluid in said chamber, applying a cooling medium to the external surface of said container to effect the condensation of the vapor therein whereby the pressure in said chamber acting on said fluid causes said fluid to flow into said container, and maintaining the fluid in said chamber at a temperature below that of the vapor in said container whereby the fluid flowing into said container causes a further condensation of said vapor.

17. The method of filling a container with a fluid, which comprises the operations of filling the container with a liquid, moving the container through a closed chamber, maintaining in said chamber an atmosphere of superheated steam having a pressure greater than that of the air surrounding said chamber, heating said container and its contents in said chamber to vaporize a portion of said liquid and thereby cause the remainder of the liquid to be expelled from said container by the vapor pressure therein, connecting said vapor filled container with a supply of sterile fluid in said chamber, applying a cooling medium to the external surface of said container to effect the condensation of the vapor therein whereby the pressure in said chamber acting on said fluid causes said fluid to flow into said container, and sealing said container before removing it from said chamber.

18. The method of filling a container with a fluid, which comprises the operations of filling the container with a liquid and inserting it in a chamber, maintaining in said chamber an atmosphere of steam at a pressure greater than that of the surrounding air whereby there is a continual flow of steam from the mouth of said chamber, heating said container and its contents in said chamber to vaporize a portion of said liquid and cause the expulsion of the remainder of said liquid from said container, then heating the said container and its vapor contents to a sterilizing temperature by superheated steam introduced into said chamber, connecting said vapor filled container with a bath of fluid in said chamber, maintaining said connections with said bath as said container moves along said chamber, subjecting the exterior of said container while so connected to the action of a cooling medium adapted to cause the partial condensation of the vapor in said container, and maintaining a flow of said fluid through said bath at a speed corresponding to the speed of movement of said container through said chamber.

19. The method of filling a container with a fluid, which comprises the operations of filling the container with a liquid and inserting it in a chamber, maintaining in said chamber an atmosphere of steam at a pressure greater than that of the surrounding air whereby there is a continual flow of steam from the mouth of said chamber, heating said container and its contents in said chamber to vaporize a portion of said liquid and cause the expulsion of the remainder of said liquid from said container, then heating the said container and its vapor contents to a sterilizing temperature by superheated steam introduced into said chamber, connecting said vapor filled container with a bath of fluid in said chamber, maintaining said connection with said bath as said container moves along said chamber, subjecting the exterior of said container while so connected to the action of a cooling medium adapted to cause the partial condensation of the vapor in said container, maintaining a flow of said fluid through said bath at a speed corresponding to the speed of movement of said container through said chamber, and maintaining the temperature of said bath of fluid below that of the vapor in said container.

20. The combination in apparatus for filling containers with a fluid, of an elongated housing, means for moving a series of containers in succession through said housing, means for heating the containers and their contents in said housing, means for connecting said containers in succession while in motion through said housing with a supply of fluid in said housing, said fluid supply being open to the pressure of the atmosphere in said housing, and means for creating a difference of pressure between the contents of said containers and the pressure within said housing acting on said fluid supply while said connections are established.

21. The combination in apparatus for filling containers with a fluid, of a housing, means for maintaining in said housing an atmosphere having a pressure greater than that of the surrounding air, means for maintaining in said housing a bath of fluid subjected to the pressure therein, means for moving the containers in succession through said housing, and means acting on said containers while in motion for heating the containers and their contents, for connecting said containers successively with said bath of fluid, and for creating in said containers while so connected a pressure less than said pressure within said housing.

22. The combination in apparatus for filling containers with a fluid, of a housing, means for maintaining in said housing an atmosphere having a pressure greater than that of the surrounding air, means for maintaining in said housing a bath of fluid subjected to the pressure therein, means for moving the containers in succession through said housing, means acting on said containers while in motion for heating the containers and their contents, for connecting said containers successively with said bath of fluid, and for creating in said containers while so connected a pressure less than said pressure within said housing, and means for closing the mouths of said containers after they have been connected with said bath.

23. The combination in apparatus for filling containers with a fluid, of an elongated housing, a conveyor for moving containers in succession through and from said housing, a liquid seal through which the containers are moved on emerging from said housing, said housing being open at its other end, means for maintaining in said housing a sterile atmosphere having a pressure greater than that of the surrounding air, means for heating said containers while in motion on said conveyor, said housing having a part adapted to contain an open bath of said fluid, said conveyor being adapted to connect the mouths of said containers while in motion with said bath of fluid, means for creating a differential of pressure between the inside and the outside of each said containers while so connected with said bath, whereby the containers are filled with said fluid, said conveyor being adapted to disconnect said containers from said bath of fluid after they are filled, and means for effecting a closure of the mouths of said filled containers before they pass through said liquid seal.

24. The combination in apparatus for filling containers with a fluid, of an elongated housing, a conveyor for moving containers in succession through and from said housing, a liquid seal through which the containers are moved on emerging from said housing, said housing being open at its other end, means for maintaining in said housing a sterile atmosphere having a pressure greater than that of the surrounding air, means for heating said containers while in motion on said conveyor, said housing having a part adapted to contain an open bath of said fluid, said conveyor being adapted to connect the mouths of said containers while in motion with said bath of fluid, means for creating a differential of pressure between the inside and the outside of each said containers while so connected with said bath, whereby the containers are filled with said fluid, said conveyor being adapted to disconnect said containers from said bath of fluid after they are filled, means for effecting a closure of the mouths of said filled containers before they pass through said liquid seal, and means operative while said containers are in motion after passing through said liquid seal for hermetically sealing the mouths of said containers.

CHESTER E. GRAY.
DAVID D. PEEBLES.